(12) United States Patent
Arslan et al.

(10) Patent No.: US 11,075,710 B2
(45) Date of Patent: Jul. 27, 2021

(54) AUTOMATIC REPEAT-REQUEST SYSTEM FOR PROVIDING ABSOLUTE SAFETY AND AUTHENTICATION IN WIRELESS NETWORKS

(71) Applicant: Istanbul Medipol Universitesi, Istanbul (TR)

(72) Inventors: Hüseyin Arslan, Istanbul (TR); Jehad M. Hamamreh, Istanbul (TR)

( * ) Notice: Subject to any disclaimer, the term of this patent is extended or adjusted under 35 U.S.C. 154(b) by 0 days.

(21) Appl. No.: 16/756,684

(22) PCT Filed: Dec. 26, 2018

(86) PCT No.: PCT/TR2018/050902
§ 371 (c)(1),
(2) Date: Apr. 16, 2020

(87) PCT Pub. No.: WO2019/209225
PCT Pub. Date: Oct. 31, 2019

(65) Prior Publication Data
US 2021/0203433 A1     Jul. 1, 2021

(30) Foreign Application Priority Data
Dec. 31, 2017   (TR) .................................. 2017/23427

(51) Int. Cl.
*H04K 1/02*       (2006.01)
*H04K 1/10*       (2006.01)
(Continued)

(52) U.S. Cl.
CPC ............... *H04K 3/825* (2013.01); *H04K 1/02* (2013.01); *H04L 1/1825* (2013.01);
(Continued)

(58) Field of Classification Search
CPC ............ H04K 3/825; H04K 1/02; H04K 1/10; H04K 2203/34; H04K 2203/16;
(Continued)

(56) References Cited

U.S. PATENT DOCUMENTS

| 7,751,353 B2 | 7/2010 | Shapira et al. |
| 8,433,894 B2 | 4/2013 | Reznik et al. |

(Continued)

FOREIGN PATENT DOCUMENTS

| JP | 2013019449 A | * | 1/2013 | ............ F16H 55/36 |
| JP | 2013196449 A | | 9/2013 | |

(Continued)

OTHER PUBLICATIONS

Chen (Multiple-antenna techniques for physical layrer security) Jun. 2017 (Year: 2017).*

(Continued)

*Primary Examiner* — Dong-Chang Shiue

(57) ABSTRACT

A system and method for providing confidentiality against eavesdropping and authentication against impersonation attacks for advanced wireless communication systems are disclosed. The method exploits ARQ as a MAC layer mechanism and artificial noise as a physical layer mechanism with maximal ratio combining to achieve secrecy. An artificial noise, not requiring class space in the channel, is designed and added to the data package based on the QoS requirements and channel condition between legitimate parties. Basically, a special AN, which does not require nullspace in the channel, is designed based on the QoS requirements and the channel condition between the legitimate parties and injected to the data packet. If the same packet is requested by the legitimate receiver (Bob), an AN cancelling signal is designed and added to the next packet. Then, an (Continued)

Figure 1:
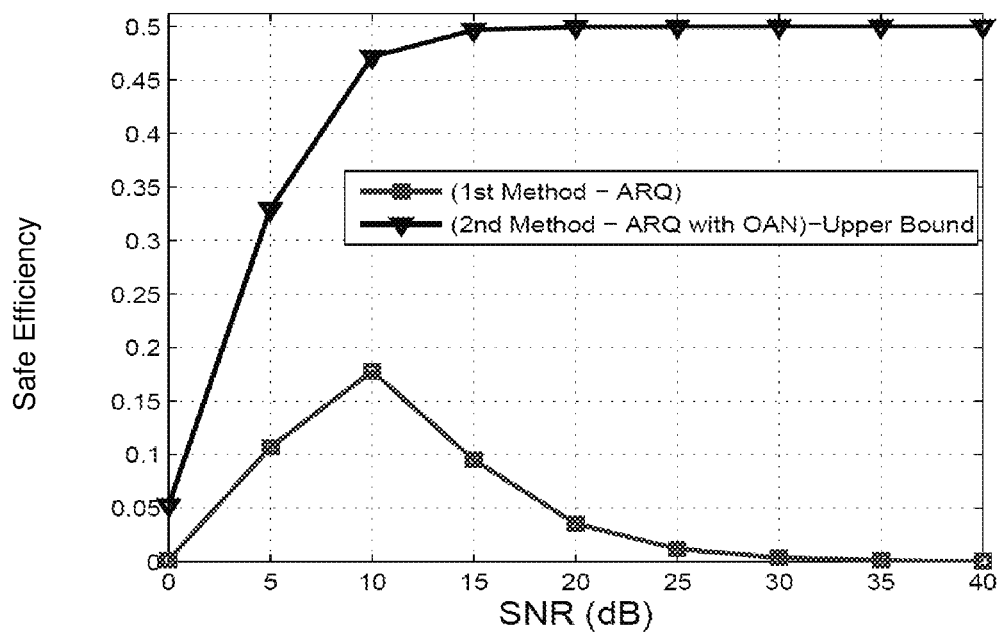

AN-free packet is obtained by using MRC process at Bob, while deteriorating the eavesdropper's performance.

6 Claims, 6 Drawing Sheets

(51) Int. Cl.
| | |
|---|---|
| *H04K 3/00* | (2006.01) |
| *H04L 9/08* | (2006.01) |
| *H04L 9/32* | (2006.01) |
| *H04W 12/03* | (2021.01) |
| *H04W 12/06* | (2021.01) |
| *H04L 1/18* | (2006.01) |
| *H04L 5/00* | (2006.01) |

(52) U.S. Cl.
CPC .......... *H04L 9/0875* (2013.01); *H04L 9/3231* (2013.01); *H04W 12/03* (2021.01); *H04W 12/06* (2013.01); *H04K 2203/16* (2013.01); *H04K 2203/18* (2013.01); *H04K 2203/32* (2013.01); *H04K 2203/34* (2013.01); *H04K 2203/36* (2013.01); *H04L 5/0007* (2013.01); *H04L 2209/80* (2013.01)

(58) Field of Classification Search
CPC ........... H04K 2203/18; H04K 2203/32; H04K 2203/36; H04L 9/0875; H04L 9/3231; H04L 1/1825; H04L 5/0007; H04L 2209/80; H04W 12/03; H04W 12/06
See application file for complete search history.

(56) References Cited

U.S. PATENT DOCUMENTS

| | | | |
|---|---|---|---|
| 9,014,665 B2 | 4/2015 | Shany et al. | |
| 9,686,038 B2 | 6/2017 | Shapira | |
| 10,069,592 B1* | 9/2018 | Krunz | ...................... H04K 3/94 |
| 10,439,755 B1* | 10/2019 | Krunz | ...................... H04K 3/94 |
| 2005/0030226 A1* | 2/2005 | Miyamoto | ........... H01Q 3/2652 |
| | | | 342/370 |
| 2014/0153723 A1 | 6/2014 | McLaughlin et al. | |
| 2020/0106545 A1* | 4/2020 | Askar | ...................... H04K 3/28 |

FOREIGN PATENT DOCUMENTS

| | | | |
|---|---|---|---|
| JP | 2014092885 A | * | 5/2014 |
| JP | 2014092885 A | | 5/014 |

OTHER PUBLICATIONS

Xu (Surveillan and Intervention of infrastructure-free Mobile comm.) Dec. 23, 2016 (Year: 2016).*

International Search Report for corresponding PCT/TR2018/050902.

Written Opinion of the ISA for corresponding PCT/TR2018/050902.

* cited by examiner

AUTOMATIC REPEAT-REQUEST SYSTEM FOR PROVIDING ABSOLUTE SAFETY AND AUTHENTICATION IN WIRELESS NETWORKS

TECHNICAL FIELD

This invention relates to a secure method and system simultaneously providing privacy against eavesdropping and authentication against spoofing attacks against for advanced wireless communication systems (such as systems 5G and beyond systems).

PRIOR ART

The protection of data transmission from confidential eavesdropping (confidentiality) is traditionally made possible by the use of cryptographic-based methods of encryption and decryption by using secret keys shared between the transmitter and the recipient, assuming that such keys cannot be known or understood by those who want to eavesdrop because of the excessive complexity resulting from the necessity of conducting extensive and detailed research to be known and predicted.

However, there are some of the drawbacks shown below that do not allow encryption-based methods to be used appropriately in future wireless communication scenarios. These drawbacks can be summarized as follows: First, the key creation, distribution and management processes between legitimate parties are extremely difficult, especially in large-scale heterogeneous and decentralized wireless networks. Second, increasing the key length leads to more resource loss as well as the impracticability of implementing security methods with Shannon's excellent privacy within today's data volume. Third, the rapid developments and advances in computer and computing devices reveal the fact that current secret key techniques can be solved, no matter how complex they are, in particular with the introduction of quantum computers. Fourth, encryption-based security causes extra delays and complexities in tactile communication applications such as autonomous driving, remote surgery, control of drone (UAV), etc. For these applications, it is necessary to ensure the highest level of secure communication with the least delay.

Due to the aforementioned problems, keyless physical (PHY) layer security has emerged as a promising concept bringing radical change that can be used to protect against eavesdropping without using the keys shared in privacy by benefiting from natural features of wireless channel including wireless transmissions, noise, power loss, interference, distribution, and diversity. This is only possible if the channel between the transmitting side (Alice) and the receiving side (Bob) is inherently better than the channel between Alice and the eavesdropper (Eve). However, in this condition, as Eve's location (which may be closer to Alice than Bod) and the channel-making process are passive in terms of the communication of legitimate parties (Alice and Bob), it can not be guaranteed in wireless communication scenarios that whether the transmitting site will have a better channel than Bob or not.

Technical Problems that the Invention Aims at Solving

In the known state of the technique, various PHY security methods have been proposed for the solution of the above problem (that Eve's channel is better than Bob's channel). The majority of these methods depend mainly on the use of one or more of the following approaches: 1) channel variations and reciprocality with the help of diversity for the extraction of shared keys; 2) space diversity such as MIMO, relays and large-scale networks for e.g. addition of AN (Artificial Noise), performing pre-coding operations, shaping antenna patterns towards reliable users (beam-forming), etc. 3) specific features in certain systems such as cyclic prefix, pilots, hardware impairments, and synchronization to disrupt Eve's reception. However, when these degrees of freedom are not available, PHY security becomes extremely hard to achieve. In spite of all these restrictions, security will be able to be provided in the MAC layer by taking advantage of the existing features associated with service quality (QoS) requirements. For instance, employing (ARQ/HARQ) protocol, that takes an advantage of the fact that only intended recipients can request retransmissions, can be used to enhance security.

In this disclosure (invention summary), a new joint PHY/MAC security method based on ARQ mechanism with null-space-independent AN that exploits the receiver structure of MRC is developed and invented to ensure security for various data services such as voice and video. Therefore, instead of relying on zero space created in multiple antennas, common relays, frequency selective channels, periodic pre-addition in OFDM, or the level of freedom at full bi-directional target destination for artificial noise formation, in this study, MRC ARQ is used for the production of artificial noise independent of zero space for protecting transmission against eavesdropping attacks for the first time in the literature. Artificial noise is basically designed based on service quality (QoS) requirements and the channel condition between legitimate parties and added to the data package. In the case of requesting the same package by Bob, an artificial noise canceling signal is designed based on the channel of the legitimate user and added to the next packet. Then, an AN free packet is obtained by using MRC process, whereas the AN deteriorates the eavesdropper's performance.

The advantages of the disclosed invention may be expressed as follows:

- It is structurally simple but very effective, and it does not require to be supported by complicated transceiver architecture. More importantly, it does not require any changes or extra processing at the receiver side thanks to the proper design of the added AN, which can be perfectly canceled during the MRC process.
- It can provide, under realistic assumptions, prefect secrecy with the aid of the added AN. This ensures that no information is leaked to Eve even if Eve's SNR is higher than the Bob's SNR.
- At the same time, it is observed that perfect privacy is not always needed to provide a perfectly safe service. In real life, each service has different QoS requirements than others, and practical privacy can be guaranteed if we ensure that Eve operates under these requirements.
- It will be able to provide privacy in one of the most challenging scenarios where there is no spatial degree of freedom (zero space), the channel is located in flat damping (ie. there is no more possibility) and there is only one antenna on the transmitter side.
- The proposed design creates an extra degree of freedom within the force field due to the added Artificial Noise that can be utilized not only for increasing privacy but also for reducing the PAPR level and reducing the OOBE level of OFDM-based systems as well as for other purposes. In other words, this scheme increases the system design flexibility.

Eve mixes Bob's signals to force them to request a retransmission so that they can receive more copies of the same package and thus increase their capacity for decoding (jamming). However, due to the fact that the Artificial Noise is added to each of the retransmission rounds in our scheme, it will be prevented that Eve will benefit from re-transmitted copies of the same package.

The maximum benefit of the proposed scheme and the best operating condition can be achieved by using OFDM based waveforms over the distribution channels. There are two reasons for this: 1) The randomness of the Artificial Noise vector is not only a function of the signal generated in the source, but also a function of the distributor channel randomness; 2) Artificial Noise can be redesigned to solve some of the main drawbacks of OFDM.

In the patent literature, there are many patent documents relating to physical layer security. Some examples are given below.

The U.S. Pat. No. 9,686,038, a method is described for providing secure communication using an antenna array for generating at least one jamming transmission together with the data transmitted and transmitting it to a target receiver.

The U.S. Pat. No. 7,751,353, is another application in the state of the art, discloses method for securing a wireless transmission by sending noise to one or more destinations other than an intended destination.

The U.S. Pat. No. 9,014,665, discloses a method for communication includes generating one or more data streams for transmission to respective target receivers, and one or more jamming streams.

The United States patent document no. US2014153723, discloses system, device and method of physical layer security which is operable to transform user data in accordance with security characteristics and to process the transformed data into a format suitable for the communication channel and further operable to transmit the processed data onto the communication channel.

The U.S. Pat. No. 8,433,894, discloses a method and an apparatus for performing physical layer security operation.

The structural and characteristic features and all advantages of the invention will completely be understood by the detailed description given below and therefore, this evaluation should be made in view of this detailed description.

DESCRIPTION OF PICTURES

FIG. 1: Graphic of the safe efficiency-SNR (dB) for when use methods ARQ and OAN with ARQ FIG. 2: Graphic of the package error rate (PER)-SNR (dB) for when Eve and Bob use MRC and they don't use MRC FIG. 3: Graphic of the average number of re-transmission-SNR (dB)

Figure 4:
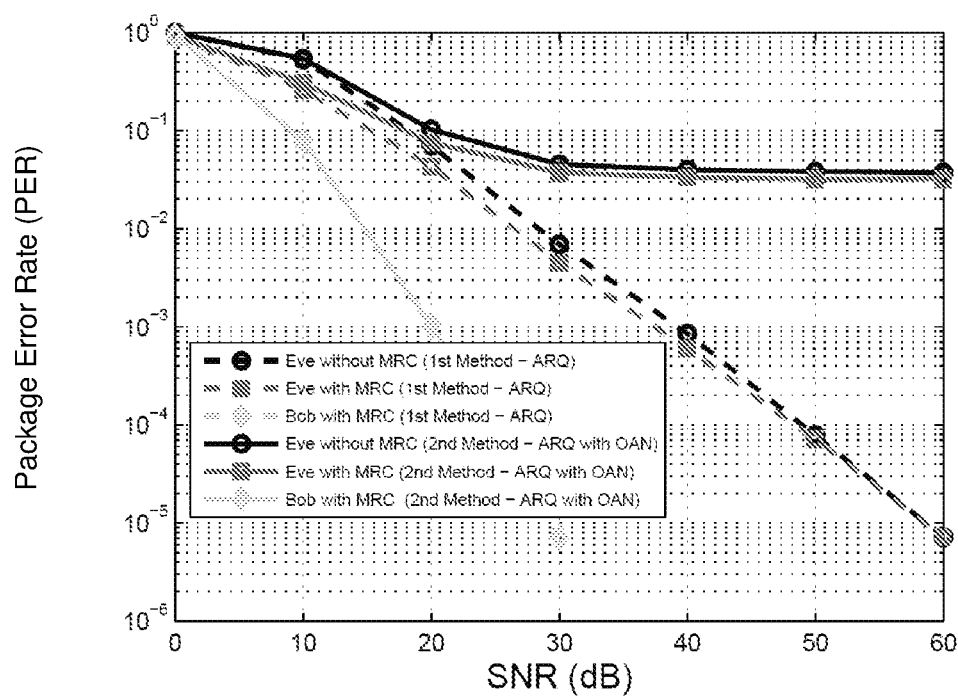

FIG. 4: Graphic of the package error rate (PER)-SNR (dB)

Figure 5:
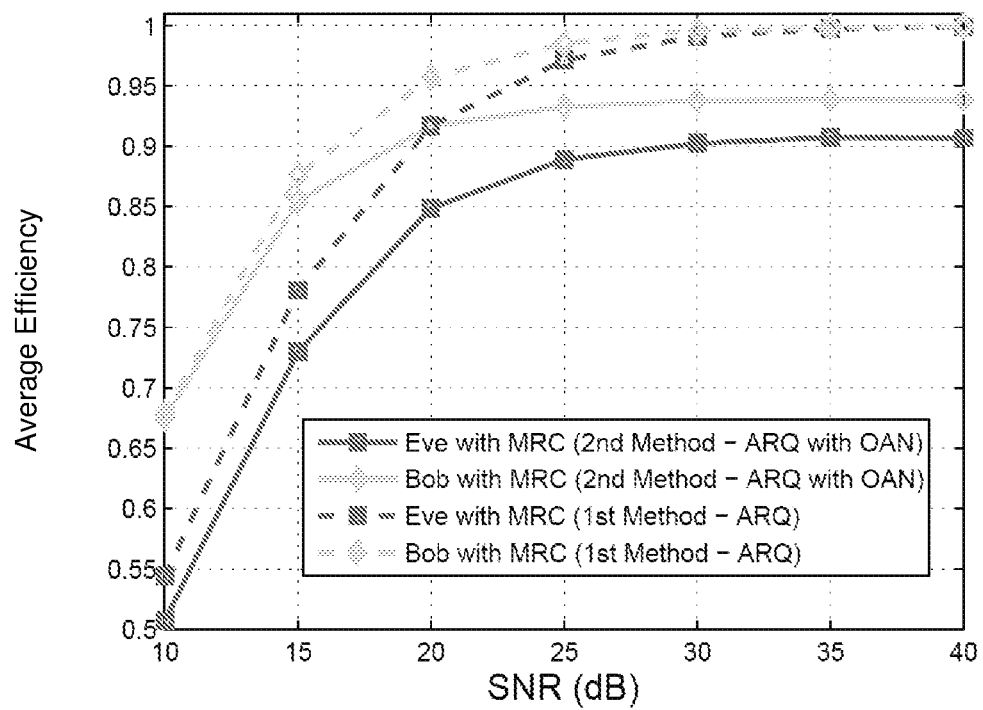

FIG. 5: Graphic of the average efficiency-SNR (dB)

Figure 6:
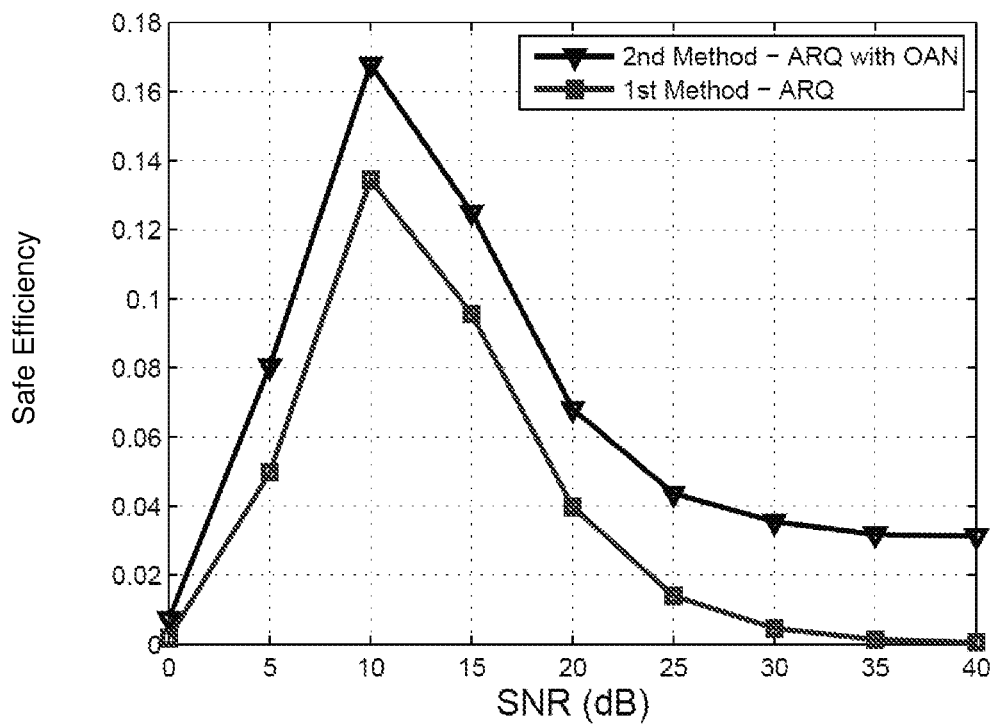
Figure 7:
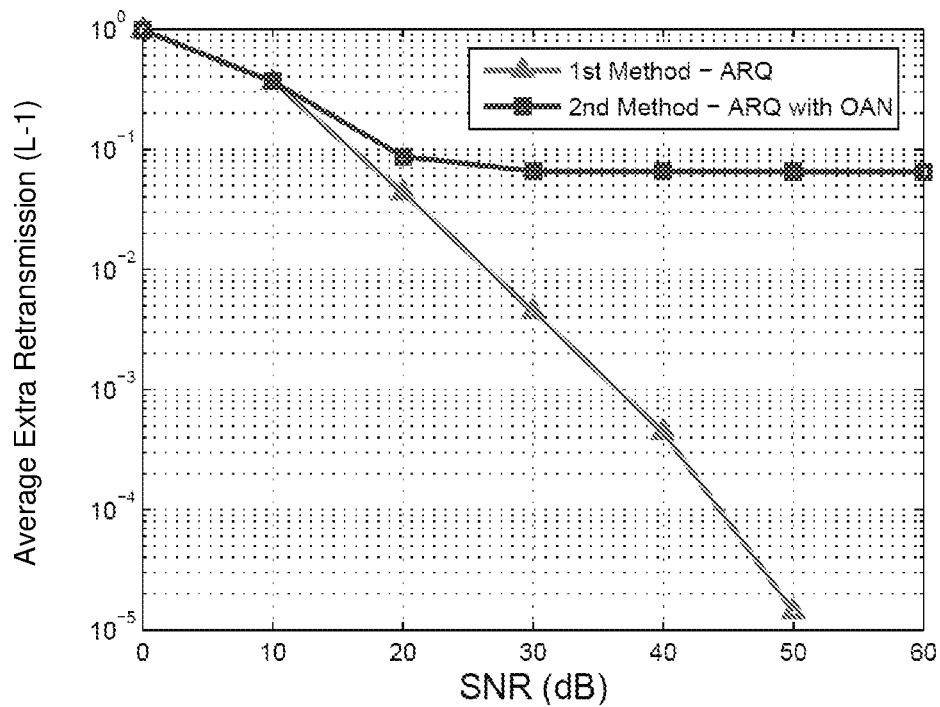

FIG. 6: Graphic of the safe efficiency-SNR (dB) for when use methods ARQ and OAN with ARQ FIG. 7: Graphic of the average extra retransmission (L−1)-SNR (dB)

Figure 8:
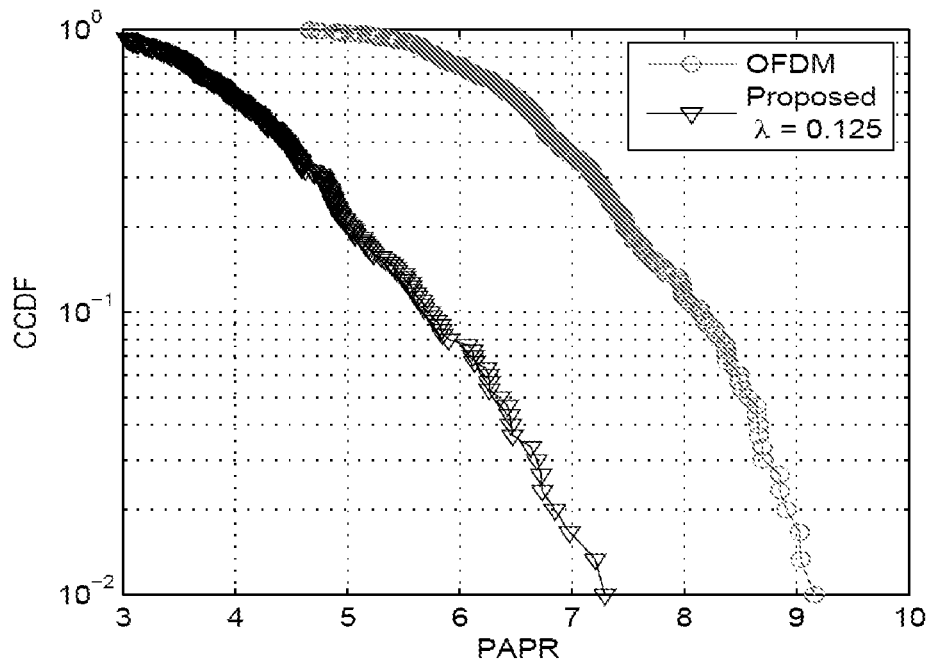

FIG. 8: Graphic of the CCDF-PAPR

Figure 9:
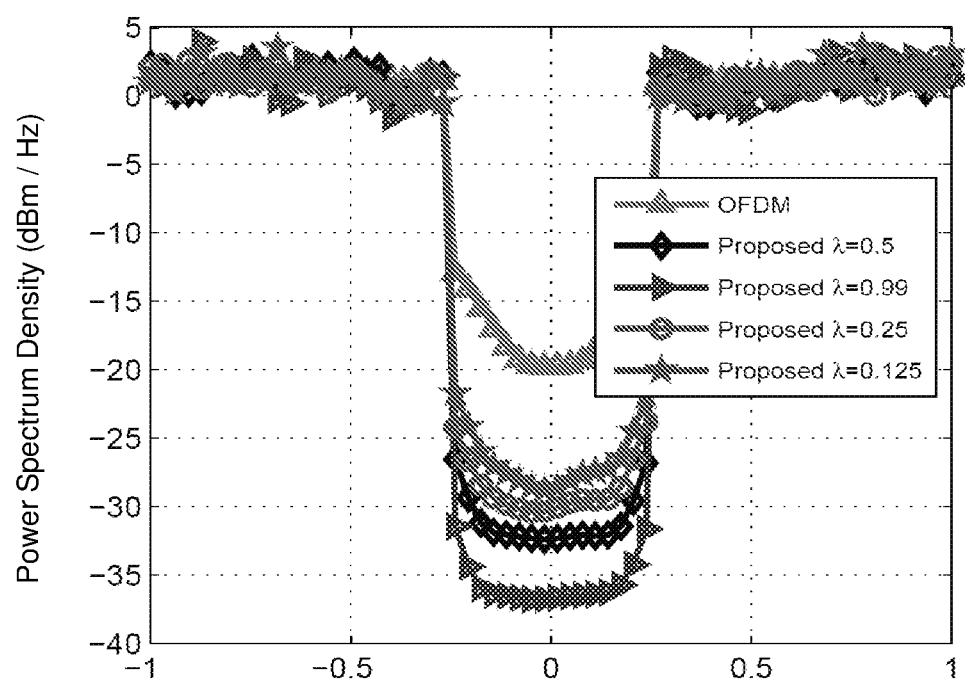

FIG. 9: Graphic of the power spectrum density

Figure 10:
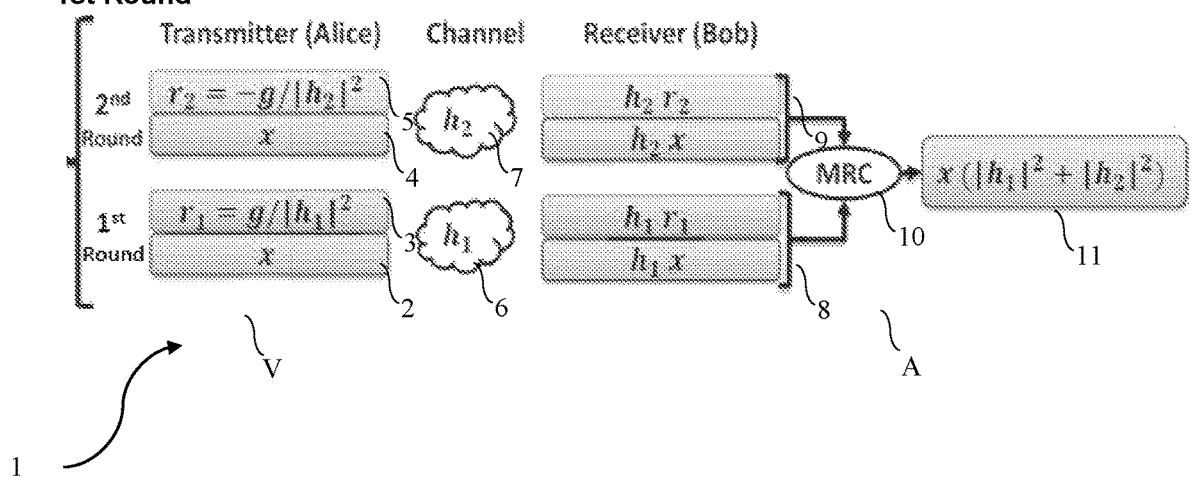

FIG. 10: A diagram showing that the channel-based artificial noise probability added to the OFDM case comes from the probability of randomly generated samples on the transmitter side and the probability of the multipath frequency-selected channel.

DETAILED DESCRIPTION OF THE INVENTION

This invention describes a practical and very effective security method and system. In particular, a mixer signal (ie, Artificial Noise) is added/superimposed on the transmission data packet x, (in the force field) on each retransmission packet, based on the channel acquisition and QoS requirements of the legitimate user. The added mixer Artificial Noise signals are designed to match each other on Bob's side, while the performance of Eve is significantly impaired when they are assembled on the receiver side using the MRC process. To achieve this, Artificial Noise, designed in a way that does not depend on zero spaces in the channel, in contrast to the existing Artificial Noise-based safety schemes in the literature, is appropriately added on the time domain signal vector (force field) in the first and second retransmission rounds and thus in the first and second rounds new received signal vectors appear as follows:

$$y_{i,1} = h_{i,1}(x+r_1)+w_{i,1} \tag{A}$$

$$y_{i,2} = h_{i,2}(x+r_2)+w_{i,2} \tag{B}$$

Here, yi, 1 and yi, 2 shows packages taken by Eve or Bob in the first and second rounds, $r1 \in CN \times 1$ (3) ve $r2 \in CN \times 1$ (5) are Artificial Noise vectors added in the first and second rounds respectively. Following the MRC process on the receiving side, $\hat{y}_i$ is as follows:

$$\hat{y}_i = y_{i,1}h^*_{i,1} + y_{i,2}h^* \tag{C}$$

$$\hat{y}_i = x|h_{i,1}|^2 + |h_{i,2}|^2 + r_1|h_{i,1}|^2 + r_2|h_{i,2}|^2 + \hat{w}_i \tag{D}$$

Figure 2:
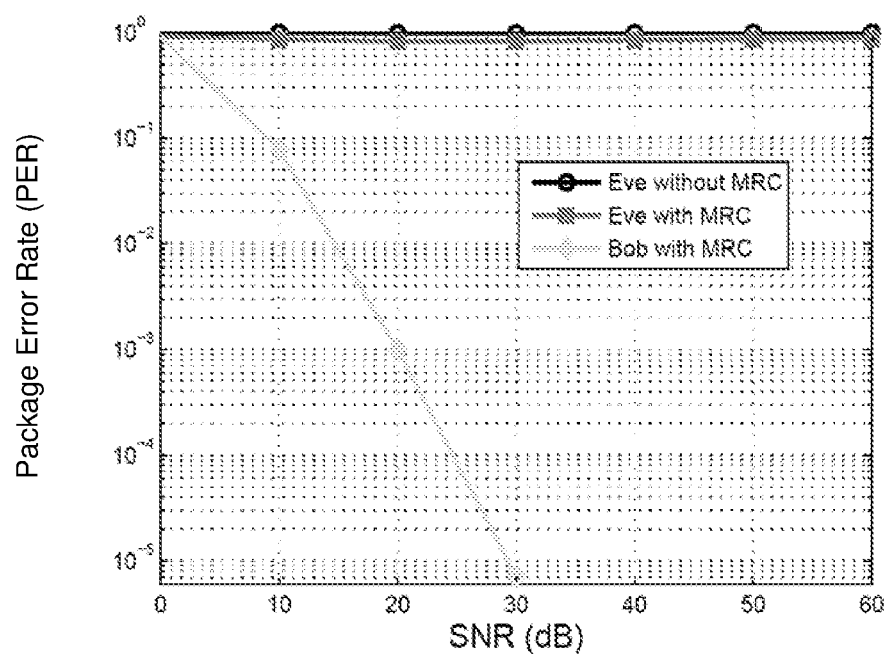
Figure 3:
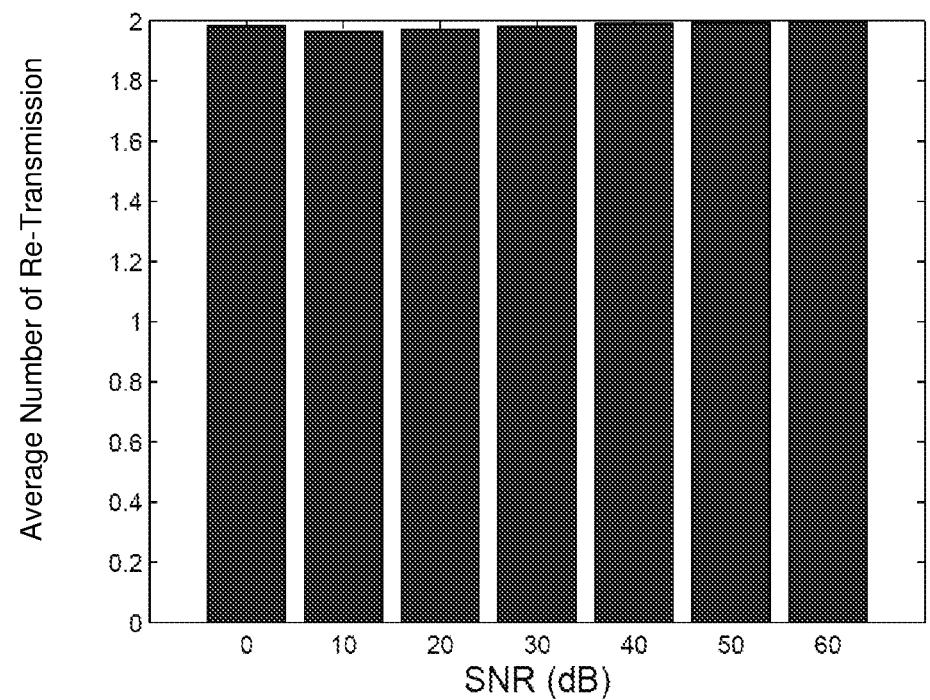

From this equation (D), we find that it is possible to design the Artificial Noise added on the transmitting side with the values r1 and r2 in such a way that it can be fully canceled only on the Bob side, as illustrated graphically in the upper part of FIG. 2. To achieve this, r1 and r2 are designed as the function of the legitimate user channel force ($|hb, k|^2$) and the random Artificial Noise vector g function as follows:

$$r1 = \frac{g}{|h_{b,1}|^2} \tag{E}$$

$$r2 = \frac{-g}{|h_{b,2}|^2} \tag{F}$$

$$g = \sqrt{0.5\phi}((2u-1)+j(2q-1)) \tag{G}$$

Here the samples of $g=[g1\ g2\ \ldots\ gN]T \in CN \times 1$ can be seen as a random vector, which can vary from one symbol to another independently of a given distribution. Thus, g may also be perceived as a single-use cipher key whose length is equal to the message length with the entropy equal to that of the message in question and does not need to be shared with the receiving side. It should also be mentioned that the design of the g design provides freedom in the following issues: 1) the modification of the structure (or distribution) of the added Artificial Noise, 2) Adjusting the added Artificial Noise force, based on QoS requirements; 3) controlling the PAPR problem resulting from Artificial Noise, which is designed to have a continuous envelope with a uniform stage distribution.

In the proposed scheme, the g value is designed to have a uniform stage distribution with a fixed envelope (such as a QAM signal) in the (G) equality (such as QAM signal), in that equation, φ is the force (variance) of the added Artificial Noise vector and is optimized based on the targeted security level to be displayed later with QoS requirements. Without losing the generality, the g value is designed to avoid the PAPR problem due to the fact that there is a fixed envelope in the uniform stage distribution as a result of the zero increase in PAPR. In order to achieve this, u and q vectors are selected to be random variables with Bernoulli distribution with one and zero values. It should also be emphasized that many of the Artificial Noise-based safety methods available in the literature use Gaussian distributed noise, which leads to a significant increase in PAPR level only because it does not have a fixed envelope. To the best of our knowledge, the PAPR problem is often neglected in existing Artificial Noise-based security methods, and this study sheds light on this problem and provides a practical solution to this problem.

On the receiving sides, the data signal vectors detected on both Bob's and Eve's side are as follows:

$$\hat{x_b} = x + \frac{\hat{w_b}}{|h_{b,1}|^2 + |h_{b,2}|^2} \quad (H)$$

$$\hat{x_e} = x + \frac{\hat{w_e} + r_1|h_{e,1}|^2 + r_2|h_{e,1}|^2}{|h_{e,1}|^2 + |h_{e,2}|^2} \quad (I)$$

When the values of r1 and r2 in equation (D) are changed, the Artificial Noise added intentionally are cancelled completely. Therefore, the determined x^ package shown in equation (H) is the same if there is no Artificial Noise added. This means that Bob's package error rate (PER) performance will in no way be affected by the use of this method. When we look at Eve's side, as Eve doesn't know Alice's channel (due to the use of robust techniques for estimating channel in TDD systems) or the added Artificial Noise vector g value (as it is not shared with the communicating parties), there will be a significant deterioration, regardless of whether MRC is used by Eve or not.

If the MRC is used, additional mixing noise resulted from the zero removal process will affect the PER level. On the other hand, in the absence of MRC usage, Artificial Noise added to each retransmission tour will automatically affect the PER value. It may be stated that the level of privacy is increasing due to the added Artificial Noise vector g value, which is added essentially by the proposed scheme, but it should also be stated that if the channel is distributed in time, frequency or both, not in flat damping, an additional source of confidentiality can be obtained.

Artificial Noise can only be redesigned based on the practical use of the wireless service, not just the Bob side channel, but also based on the QoS requirements of the requested service. Therefore, only the optimum Artificial Noise (OAN) with sufficient strength to reduce Eve's reception performance is added while trying to keep Bob's performance at the level prior to Artificial Noise addition. The following steps outline how the security method proposed in the context of LTE and future 5G and beyond networks:

TABLE I

QoS LOOKUP TABLE

| Service | Delay | L | PERt | $_rSNRe$ | φ |
|---------|-------|---|------|----------|---|
| Voice | 100 ms | 2 | 10-2 | 30 dB | 0.01 |
| Video | 150 ms | 3 | 10-3 | 40 dB | 0.001 |

1. The transmitter (Enode-B) determines which service the legitimate wireless user is intending to use.
2. According to the requested service, Enode-B (Alice) determines a PER threshold (PERt) from a look-up table, as presented in Table I, which is required to reliably accommodate a legitimate user with the requested service.
3. Based on the determined PER and from the extensive off-line PER simulation results obtained for Eve, Enode-B identifies the corresponding required SNR for Eve (SNRe) to eavesdrop the service reliably.
4. From the found SNR, Enode-B calculates a rough optimum value for the needed noise power to sufficiently degrade Eve's performance using this formula, $$\phi = 10 \frac{-SNR_t^e(dB) + 10}{10}$$

5. A uniformly distributed noise with the previously calculated power, is intentionally added on top of the transmitted packet in the first and second retransmission round in such a way that they will cancel each other after they get combined at only the intended receiver as explained before.

According to this method, it is seen that there is no need to have a perfect level of privacy in order to provide a completely secure communication in many services that are used daily, such as audio and video. This is because this method forces Eve to work in such a way that it cannot achieve the QoS requirements needed to interrupt and reliably use such services. Therefore, there is no way to benefit from the ongoing service. Although we aim to achieve a good trade-off between reliability, efficiency, delay and confidentiality at the outset, our method shows that, with efficiency only half reduced, an excellent level of confidentiality can be achieved to provide full secure messaging.

This is ensured by the fact that the first packet transmission is always received incorrectly, while in the second round the retransmitted packet is received by sending an appropriate noise force, the noise added in the first round can be completely canceled. It has been found out that this can be achieved by using a comprehensive simulation, provided that the added Artificial Noise variance is equal to the SNR of Bob (ie, =SNRdB).

Utilizing the Proposed Design for Reducing PAPR and OOBE of OFDM-Based Waveforms In addition to the privacy level, the added Artificial Noise can also be used to achieve other benefits. In particular, the added Artificial Noise structure can be intelligently redesigned not only to provide security, but also to reduce the PAPR value in OFDM systems and to alleviate the OOBE value. Here we discuss two new designs that can achieve the aforementioned objectives. In the first embodiment, the Artificial Noise signal may be optimized to reduce the PAPR value, subject to a particular privacy condition defined by the added Artificial Noise force level; in the second design, the Artificial Noise signal may be redesigned to minimize the OOBE level, which is indirectly subject to a level of force represented by a well-defined privacy restriction. Furthermore, with the use of the proposed safety method in multi-carrier systems, it should be mentioned that it provides a more resilient method to those eavesdropping because of the greater possibility of multi-path frequency selective channels in OFDM. In particular, the possibility of channel-based Artificial Noise added in the case of OFDM comes not only from randomly generated samples on the transmitter side, but also from the possibility of a multi-path frequency selective channel.

It is evident that one skilled in the technique can also introduce the novelty set forth in the invention using similar embodiments, and/or apply this embodiment to other similar purposes as used in the technique. Thus, it is evident that such embodiments will be devoid of the criterion of innovation and in particular of exceeding the known state of the art.

INDUSTRIAL APPLICABILITY/APPLICATION OF INVENTION TO INDUSTRIALIZATION

It is very possible to transfer the described invention to the industry by proposing its technical advantages and merits to the wireless standardization communities such as IEEE, 3GPP, and ITU to adopt it in the future standards. Also, the invention can be utilized by high-tech wireless security companies that are interested in building secure wireless communication devices including access points, base stations, mobile handset, and IoT terminals. Specifically, the merits of the proposed design can make it a good candidate solution for future secure wireless systems (5G and Beyond).

The invention claimed is:

1. A method and system designed to provide data authentication against absolute data privacy and spoofing against hidden eavesdropping without the need for extra changes or leading extra changes on the receiving side and without the use of or secret keys in wireless communication systems, comprising: at least one superimposed mixer signal that runs on a transmitter Tx and converts data packets required to be transferred in the device into secure, stored data packets, added to the data packet to be transmitted in a first Automatic Repeat-Request (ARQ) round, named sequential noise r1; at least a second superimposed mixer signal that runs on the transmitter Tx and converts data packets required to be transferred in the device into secure, stored data packets, added to the data packet to be transmitted in a second ARQ round, named sequential noise r2; at least one maximal ratio combination (MRC) process that can combine the first received data packet and the second received data packet in a manner designed to cancel and remove the interference effect of the superimposed mixer signals r1 and r2 while improving the reliability of the data acquisition quality.

2. A system according to the claim 1, characterized by the appropriately designed superimposed mixer signals, which are configured to operate on the transmitter Tx on a device that can exchange secure data with wireless networks, as well as a function of Quality of service (QoS) requirements of the service to be secured with legitimate channel width.

3. A system according to the claim 1, wherein the addition of superimposed mixer signals designed and configured to completely cancel the interference effects at the location of the legitimate receiver, while causing interference in the receiving nodes of a different position.

4. A system according to the claim 1, wherein the spatial degree of freedom (zero space generated by the multiple antennas) is absent, the channel is located within the flat damping (ie, there is no more possibility) and can provide privacy in one of the most challenging scenarios with a single antenna on the transmitting side.

5. A system according to the claim 1, characterized not only by increasing the privacy but also by reducing the level of Peak-to-Average Power Ratio (PAPR) and alleviating the Out-of-Band Emission (OOBE) level of OFDM-based (Orthogonal Frequency Division Multiplexing) systems, as well as creating additional degrees of freedom within the force field due to the inserted Artificial Noise (AN) which can be used for other purposes.

6. A system according to the claim 1, wherein it can be obtained by using OFDM based waveforms over the distribution channels.

* * * * *